(No Model.)

J. W. SCHOAF.
NUT LOCK.

No. 514,339. Patented Feb. 6, 1894.

WITNESSES:
Fred G. Dieterich
P. B. Turpin.

INVENTOR
John W. Schoaf.
BY Munn & Co
ATTORNEYS.

UNITED STATES PATENT OFFICE.

JOHN WILLIAM SCHOAF, OF McKEESPORT, PENNSYLVANIA.

NUT-LOCK.

SPECIFICATION forming part of Letters Patent No. 514,339, dated February 6, 1894.

Application filed December 19, 1892. Serial No. 455,644. (No model.)

*To all whom it may concern:*

Be it known that I, JOHN WILLIAM SCHOAF, of McKeesport, in the county of Allegheny and State of Pennsylvania, have invented a new and useful Improvement in Nut-Locks, of which the following is a specification.

My invention is an improvement in that class of nut locks employing a spring washer formed of a spring split ring having its ends projected in opposite directions to act as pawls against the nut and the fish plate or other bearing surface, and the invention consists in fitting a guard plate over said spring washer such plate being formed of a thickness in excess of the axial thickness of the washer but less than the normal distance between the extremities of its opposite points or ends, so that the said washer may be partly compressed but cannot be mashed flat and so be damaged or made useless as more fully described hereinafter.

Figure 1:
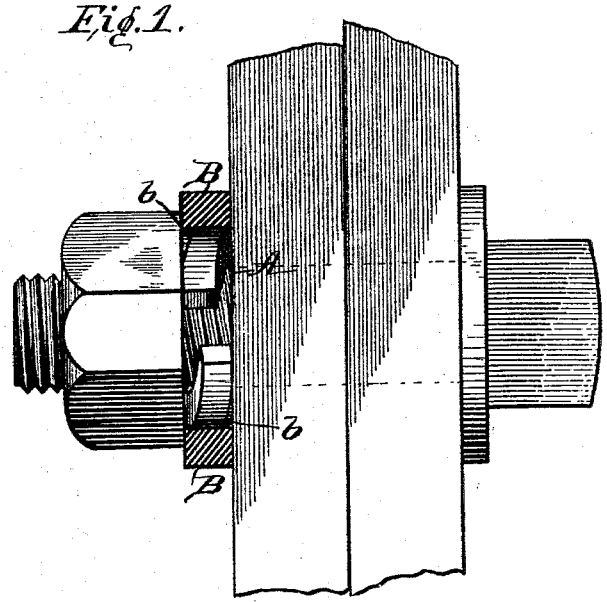
Figure 2:
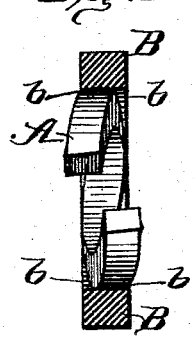
Figure 3:
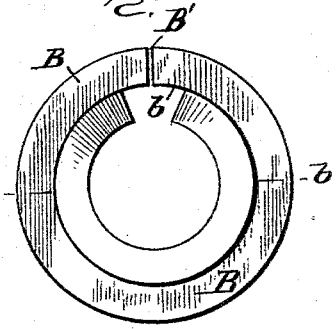

In the drawings, Figure 1 is a sectional side view of the improvement. Fig. 2, is a detail sectional view. Fig. 3, is a detail face view of the improvement.

The split spring washer A is not claimed as new in itself it being the well known spring washer having its ends or points projecting in opposite directions to act like pawls as is well known. In the use of this washer the nut being turned up thereagainst it is found that the flattening of the spring and the holding of it so flattened by the nut soon destroys the tension of the washer and renders it defective or useless. To prevent so flattening the spring is the purpose of my invention as before suggested. In attaining this end I provide a guard B made of a thickness less than the distance between the extremities of the points or ends of the spring washer when the latter is fully expanded but in excess of the distance between the said points when the spring is flattened to its fullest extent so that with said guard over the washer, a nut turned up against the guard and washer cannot be turned so far up as to flatten the spring washer as it will be stopped by the guard, but still said nut will be locked by the washer as will be readily seen.

In the construction shown, and as preferred, the guard B is a plate having an opening *b* fitted to receive the washer A and made of a thickness greater than the axial thickness of the spring washer but less than the distance between its ends or points when expanded, so that the nut will partially compress said spring washer sufficiently to cause the same to lock without permitting the flattening out of said washer. Thus it will be seen the plate does not prevent the proper operation of the locking washer and at the same time prevents injury to the washer by compressing the same flat.

The guard plate may be of steel, iron or other suitable material.

While the guard is shown as round and as split at B' it is obvious that it may be made continuous and in any desired shape, but the split or separated construction may be preferred because in case of any outward expansion of the spring washer it may spread therewith and prevent binding of the locking washer.

Having thus described my invention, what I claim as new, and desire to secure by Letters Patent, is—

1. A nut lock comprising a split spring washer and a guard plate having an opening fitted to receive said washer and made of a thickness in excess of the axial thickness of the spring washer but less than the distance between the extremities of its ends or points substantially as set forth.

2. A nut lock composed of a split spring washer having its ends or points projected in opposite directions and a guard fitted over said washer and made of a thickness less than the distance between the extremity of said points when expanded and in excess of the distance between said points when the spring washer is compressed to its fullest extent all substantially as and for the purposes set forth.

JOHN WILLIAM SCHOAF.

Witnesses:
JOHN E. LYNCH,
O. M. HUNTER.